July 17, 1923.
W. TIMSON
1,461,741
PENDULOUS AUTOMATIC WEIGHING SCALE
Filed Dec. 7, 1921       2 Sheets-Sheet 1
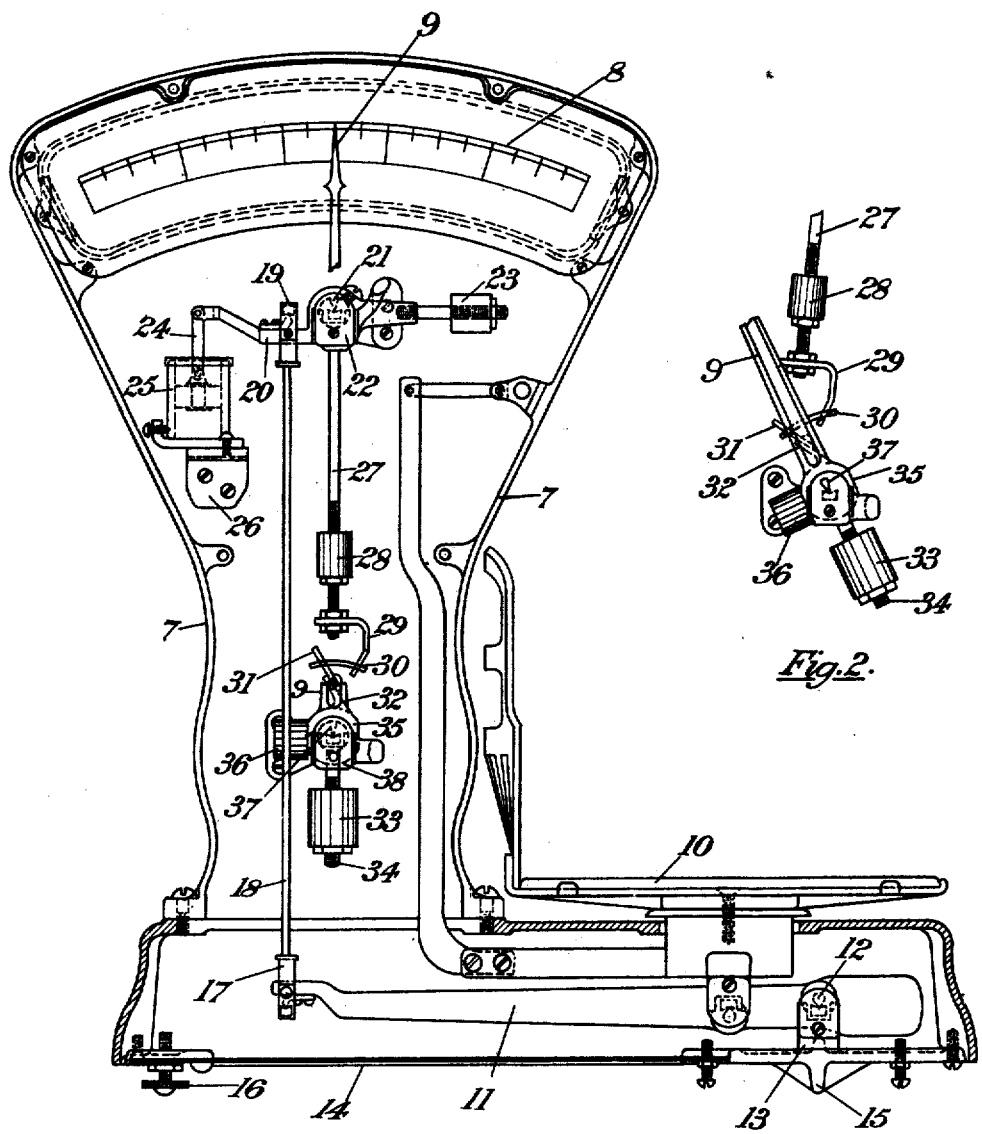

July 17, 1923.

W. TIMSON

PENDULOUS AUTOMATIC WEIGHING SCALE

Filed Dec. 7, 1921

W. TIMSON.
INVENTOR
BY George E. Folkis
ATTORNEY.

Patented July 17, 1923.

1,461,741

UNITED STATES PATENT OFFICE.

WILLIAM TIMSON, OF BIRMINGHAM, ENGLAND, ASSIGNOR TO W. & T. AVERY, LIMITED, OF BIRMINGHAM, ENGLAND.

PENDULOUS AUTOMATIC WEIGHING SCALE.

Application filed December 7, 1921. Serial No. 520,690.

*To all whom it may concern:*

Be it known that WILLIAM TIMSON, a subject of the King of Great Britain, residing at Soho Foundry, Birmingham, England, has invented a new and useful Improvement in Pendulous Automatic Weighing Scales; and he does hereby declare the following to be a full, clear, and exact description of the same.

This invention has reference to improvements in pendulous automatic weighing scales of that kind in which two pendulums are employed which move in opposite directions in order to automatically counteract any error in the level of the scale to maintain the indicator in its correct position irrespective of the level. Our present invention differs from known scale constructions of this kind in the disposition of the two pendulums, in combination with the connexion between the pendulums, and in the mounting of the indicator.

The invention will now be described in conjunction with the accompanying drawings wherein similar reference numerals indicate similar parts in the several views.

Fig. 1 is a part sectional front elevation of the scale, the pendulum resistances and the weight indicating pointer being shown in the mid load position.

Fig. 2 is a detail view extracted from Fig. 1, illustrating the movements of the two pendulums and the weight indicating pointer the mechanism being in the zero or no load position.

Figure 4:
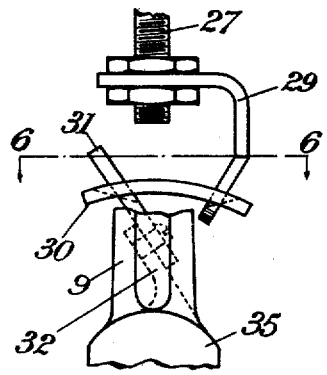
Figure 5:
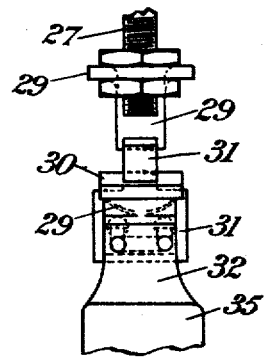
Figure 6:
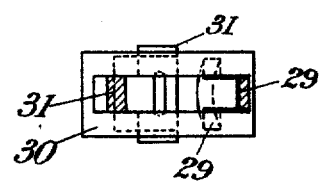
Figure 3:
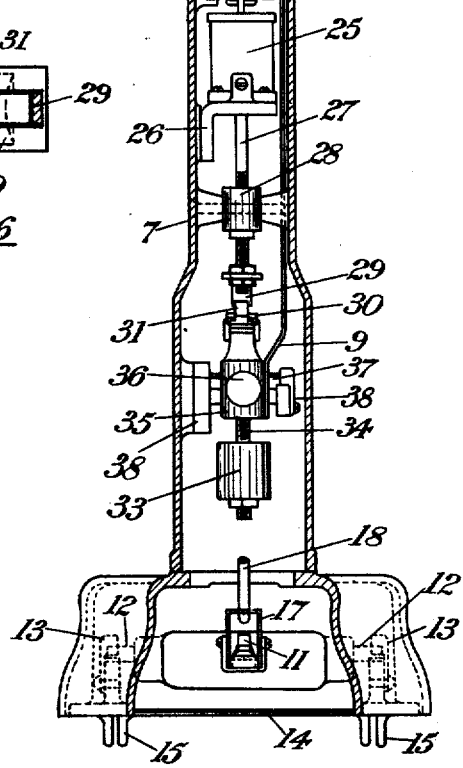
Fig. 3 is a cross sectional elevation at right angles to Fig. 1 viewed from the left hand side, the left hand side of the housing being deemed to have been removed.

Figs. 4, 5, and 6 are respectively front elevation, end elevation and a sectional plan on line 6—6 of Fig. 4, all drawn to an enlarged scale illustrating the peculiar stay and plate connexion between the two pendulums.

These drawings illustrate an automatic scale particularly applicable for shop counter use, the scale mechanism is located within a housing 7 the upper part of which is provided with a weights graduation chart 8 across which the fork ended weight index pointer 9 moves. The scale pan 10 is mounted in the usual manner on a lever 11 which is fulcrumed at the knife-edge 12 on the bearing bracket 13 which is mounted on the base plate 14. This base plate is provided with feet 15 and an adjustable levelling screw 16. The inner end of the lever 11 is supported by the rectangular link 17 mounted at the lower end of the connecting rod 18 which is suspended at its upper end by means of another rectangular link 19 from a knife-edge on the weighbeam 20, this weighbeam is fulcrumed by means of a knife-edge 21 on the bracket 22 connected to the front and back of the scale housing 7, and this weighbeam is provided with an adjustable balance weight 23 on one arm of the weighbeam, the other arm of the weighbeam being pivotally connected to the piston rod 24 of the dashpot or vibration checking device 25, this dashpot being mounted on the bracket 26 secured to the housing 7.

Dependent from the weighbeam 20 and vertically below the fulcrum knife-edge 21 thereof is a rod 27 on which is adjustably mounted one of the pendulous weights 28 forming part of the weighing resistance of the scale, this rod is connected at its lower end by means of a cranked knife-edged plate 29 to a segmental knife-edged stay 30, the stay being in turn connected to a knife-edged plate 31 which is secured by screws to an arm 32 disposed below the rod 27, this arm 32 is connected to the second adjustable pendulous weight 33 which also forms part of the weighing resistance of the scale, the pendulous weight 33 being mounted on the screwed rod 34 which is disposed vertically below and in alignment with the screwed rod 27. The arm 32 which is an integral part of the cylindrical boss 35 is also provided with a third pendulous weight 36, these pendulous weights forming the total weighing resistant of the scale. The screwed rod 34 is secured at its upper end in the cylindrical boss 35 and by means of a knife-edge 37; the boss 35, arm 32, pendulous weights 33 and 36, and the rod 34 are mounted on a common fulcrum on the bracket 38 which is mounted on the scale housing. Secured to the front face of the cylindrical boss 35 is the lower end of the index pointer 9 which is shown broken off in Fig. 1 for the sake of clearness, the pointer being forked at its upper end as clearly seen in Fig. 2 to simultaneously indicate both to the salesman and the purchaser the weight indication on both sides of the chart 8.

The particular novelty of the present invention resides in the particular disposition of the adjustable pendulous weights relative to each other, and in the method of connecting the pendulums by means of the knife-edged plates and stays 29, 30 and 31, which latter feature is shown clearly in Figs. 4, 5 and 6.

Claim:—

An automatic weighing scale comprising in combination a scale pan, a lever upon which the scale pan is mounted, a connecting rod, a weighbeam connected to said lever by said connecting rod, a rod mounted in said weighbeam, a pendulum weight adjustably mounted on said rod, a second pendulum weight mounted vertically below aforesaid pendulum weight, a screw threaded rod on which said second pendulum is adjustably mounted, a knife-edge mounting for the second pendulum weight, a weight indicator connected to the second pendulum weight mechanism, and knife-edged plates and stays connecting the pendulous weighbeam with the second pendulum weight, for the purpose herein set forth.

In testimony whereof, I have signed my name to this specification.

WILLIAM TIMSON.